United States Patent
Langdon et al.

(10) Patent No.: US 7,509,759 B2
(45) Date of Patent: Mar. 31, 2009

(54) SYSTEM AND METHOD OF DEWATERING DREDGE SPOILS USING SLOPING DRAIN BARGE

(75) Inventors: Brian Bernard Langdon, Newcastle, WA (US); Kenneth Anthony Preston, Bainbridge Island, WA (US); Thomas Edward Coultas, Kingston, WA (US)

(73) Assignee: General Construction Company, Poulsbo, WA (US)

( * ) Notice: Subject to any disclaimer, the term of this patent is extended or adjusted under 35 U.S.C. 154(b) by 535 days.

(21) Appl. No.: 11/044,116

(22) Filed: Jan. 26, 2005

(65) Prior Publication Data

US 2006/0162195 A1 Jul. 27, 2006

(51) Int. Cl.
  *E02D 17/16* (2006.01)
  *B01D 36/04* (2006.01)
  *B01D 29/00* (2006.01)
  *B01D 29/44* (2006.01)

(52) U.S. Cl. ................ 37/307; 210/242.1; 210/248; 210/251; 210/295; 210/300; 210/305; 210/320; 210/513

(58) Field of Classification Search ................ None
See application file for complete search history.

(56) References Cited

U.S. PATENT DOCUMENTS

| | | | | |
|---|---|---|---|---|
| 2,310,009 A | * | 2/1943 | Dedrick et al. | ........... 210/723 |
| 2,817,440 A | * | 12/1957 | Casner et al. | ........... 209/208 |
| 3,673,716 A | * | 7/1972 | Trondle | ............. 37/322 |
| 3,885,331 A | * | 5/1975 | Mathieu | ............. 37/344 |
| 3,964,184 A | * | 6/1976 | Mathieu | ............. 37/195 |
| 4,010,560 A | * | 3/1977 | Diggs | ............. 37/308 |
| 4,169,638 A | * | 10/1979 | Cirasuolo et al. | ............ 312/229 |
| 4,236,998 A | * | 12/1980 | Heys | ............ 209/235 |
| 4,372,448 A | * | 2/1983 | Drach | ............ 211/41.3 |
| 4,480,343 A | * | 11/1984 | Drach | ............ 4/656 |
| 4,495,065 A | * | 1/1985 | DeReamer et al. | ......... 209/243 |
| 4,531,641 A | * | 7/1985 | Archambault | ............ 211/41.3 |
| 5,020,858 A | * | 6/1991 | Nishikawa | ............ 299/8 |
| 5,143,224 A | * | 9/1992 | Burchell | ............ 209/579 |
| 5,158,184 A | * | 10/1992 | Craft et al. | ............ 211/41.3 |
| 5,287,975 A | * | 2/1994 | Chumley et al. | ............ 209/3 |
| 5,387,056 A | * | 2/1995 | DeLuca | ............ 405/128.45 |
| 5,427,251 A | * | 6/1995 | Landmann et al. | ........... 209/388 |

(Continued)

*Primary Examiner*—Robert James Popovics
(74) *Attorney, Agent, or Firm*—Mann Law Group

(57) ABSTRACT

An apparatus for dewatering dredge spoils includes a floating barge having a planar upper surface or deck. One end of the barge, such as the stern, is partially flooded or otherwise ballasted so that the deck slopes downwardly from the bow toward the stem. Dredge spoils removed from a waterway are deposited onto the bow where they flow down toward the stem. A plurality of concrete blocks on the deck form an attenuator that, in turn, defines one or more settling ponds on the surface of the barge. A weir across the stem of the barge forms an additional settling pond at the rear of the barge. Solids suspended in the water removed from the waterway settle out onto the deck when the dredge spoils are deposited onto the bow. Remaining solids suspended in the water deposit onto the deck as the water flows through the settling ponds. The relatively clear water that remains then flows back into the waterway off the stem of the sloped barge after passing through the settling ponds. Because the apparatus and method use materials and equipment, such as the barge and blocks, that are already likely to be on hand, the method and apparatus are particularly economical and easy to implement.

6 Claims, 6 Drawing Sheets

U.S. PATENT DOCUMENTS

| | | | |
|---|---|---|---|
| 5,575,921 A * | 11/1996 | Askin et al. | 210/710 |
| 5,614,094 A * | 3/1997 | Deister et al. | 210/388 |
| 5,632,571 A * | 5/1997 | Mattox | 405/19 |
| 5,656,174 A * | 8/1997 | Hodges et al. | 210/705 |
| 5,921,401 A * | 7/1999 | Johnston | 209/315 |
| 5,938,936 A * | 8/1999 | Hodges et al. | 210/705 |
| 6,079,568 A * | 6/2000 | Loshe | 209/311 |
| 6,142,308 A * | 11/2000 | Ghosh et al. | 209/3 |
| 6,149,811 A * | 11/2000 | Hodges et al. | 210/328 |
| 6,186,336 B1 * | 2/2001 | Rohr | 209/233 |
| 6,189,243 B1 * | 2/2001 | Oikawa | 37/317 |
| 6,352,159 B1 * | 3/2002 | Loshe | 209/268 |
| 6,371,301 B1 * | 4/2002 | Schulte et al. | 209/405 |
| 6,409,914 B1 * | 6/2002 | Keppeler et al. | 210/151 |
| 6,412,644 B1 * | 7/2002 | Crabbe et al. | 209/309 |
| 6,607,080 B2 * | 8/2003 | Winkler et al. | 209/399 |
| 6,715,611 B2 * | 4/2004 | Crabbe et al. | 209/309 |
| 6,863,183 B2 * | 3/2005 | Schulte et al. | 209/405 |
| 7,018,532 B2 * | 3/2006 | Kaufman | 210/205 |
| 7,198,156 B2 * | 4/2007 | Schulte et al. | 209/309 |
| 7,216,767 B2 * | 5/2007 | Schulte et al. | 209/309 |
| 7,350,322 B2 * | 4/2008 | Langdon | 37/317 |
| 2004/0238464 A1 * | 12/2004 | Cheung | 211/41.3 |
| 2005/0241192 A1 * | 11/2005 | Langdon | 37/340 |
| 2006/0137725 A1 * | 6/2006 | Yang et al. | 134/58 D |
| 2006/0162195 A1 * | 7/2006 | Langdon et al. | 37/466 |
| 2007/0170099 A1 * | 7/2007 | Stolworthy | 209/44 |
| 2007/0221555 A1 * | 9/2007 | Hodges et al. | 210/154 |
| 2008/0251465 A1 * | 10/2008 | Ralph et al. | 210/738 |

* cited by examiner

SYSTEM AND METHOD OF DEWATERING DREDGE SPOILS USING SLOPING DRAIN BARGE

FIELD OF THE INVENTION

This invention relates generally to dredging equipment and more particularly to devices and methods for separating and collecting the solid components of dredge spoils.

BACKGROUND OF THE INVENTION

Dredging is a common operation wherein bottom materials, such as mud, sand and sediment, are removed from a waterway. Dredging can be performed for a number of reasons, such as increasing the depth of a harbor, channel or river to permit the safe passage of deep-draft vessels. Dredging can also be performed to permit the recovery of minerals or other valuable raw materials from areas that are underwater. In addition, dredging can be used to remove contaminated sediments from polluted harbors and rivers as part of a remedial clean-up operation.

Typically, dredging is performed by means of a crane operated bucket that is repeatedly raised and lowered into the water to scoop up bottom materials and bring them to the surface for removal. Other forms of dredging can be accomplished using pumps to remove bottom materials and pump them to the surface in a water-based slurry. Whatever the purpose or method, dredging operations inherently create the problem of what to do with the "spoils" created as mud, sand, sediment and other materials are removed from the bottom and brought to the surface.

Typically, water makes up a large part of the dredge spoils. The goal of dredging, however, is not to remove water from the waterway but, rather, solids from the bottom. The water is brought up as an unavoidable consequence inherent in the dredging operation itself. Unless contaminated by the dredging operation itself, it is most economical and practical to return the water component of the dredge spoils to the waterway after removing the solid components. This is most economical and practical if it can be carried out on site without necessitating transportation of the spoils over long distances. A variety of techniques have, therefore, been developed for dewatering dredge spoils in dredging operations. Although effective, such techniques have left room for improvement in terms of simplicity, efficiency and economy.

SUMMARY OF THE INVENTION

The invention provides a system for dewatering dredge spoils including a sloping, generally planar surface having an uphill end and a downhill end, and an attenuator between the uphill end and the downhill end defining a settling pond on the surface.

The invention also provides a method of dewatering dredge spoils comprising the steps of providing a sloping, generally planar surface having an uphill end and a downhill end, providing an attenuator on the surface between the uphill end and the downhill end to form a settling pond on the surface, and depositing the dredge spoils onto the uphill end of the surface upstream of the attenuator so that solid components of the dredge spoils settle out and are deposited onto the planar surface as liquid component of the dredge spoils flow along the surface toward the downhill end.

The invention also provides a sloping dredge barge for dewatering dredge spoils, comprising a floating barge having a generally planar upper surface. The barge is ballasted so that the upper surface slopes from an uphill end to a downhill end. A plurality of blocks disposed along the upper surface form an attenuator defining a first settling pond on the upper surface upstream of said attenuator. A plurality of blocks form a weir adjacent the downhill end and define a second settling pond upstream of the weir and downstream of the attenuator. Solid components of the dredge spoils deposited onto the surface adjacent the uphill end settle out and are deposited onto the planar surface as liquid component of the dredge spoils flow through the settling ponds toward the downhill end.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements and wherein:

DETAILED DESCRIPTION

Figure 1:
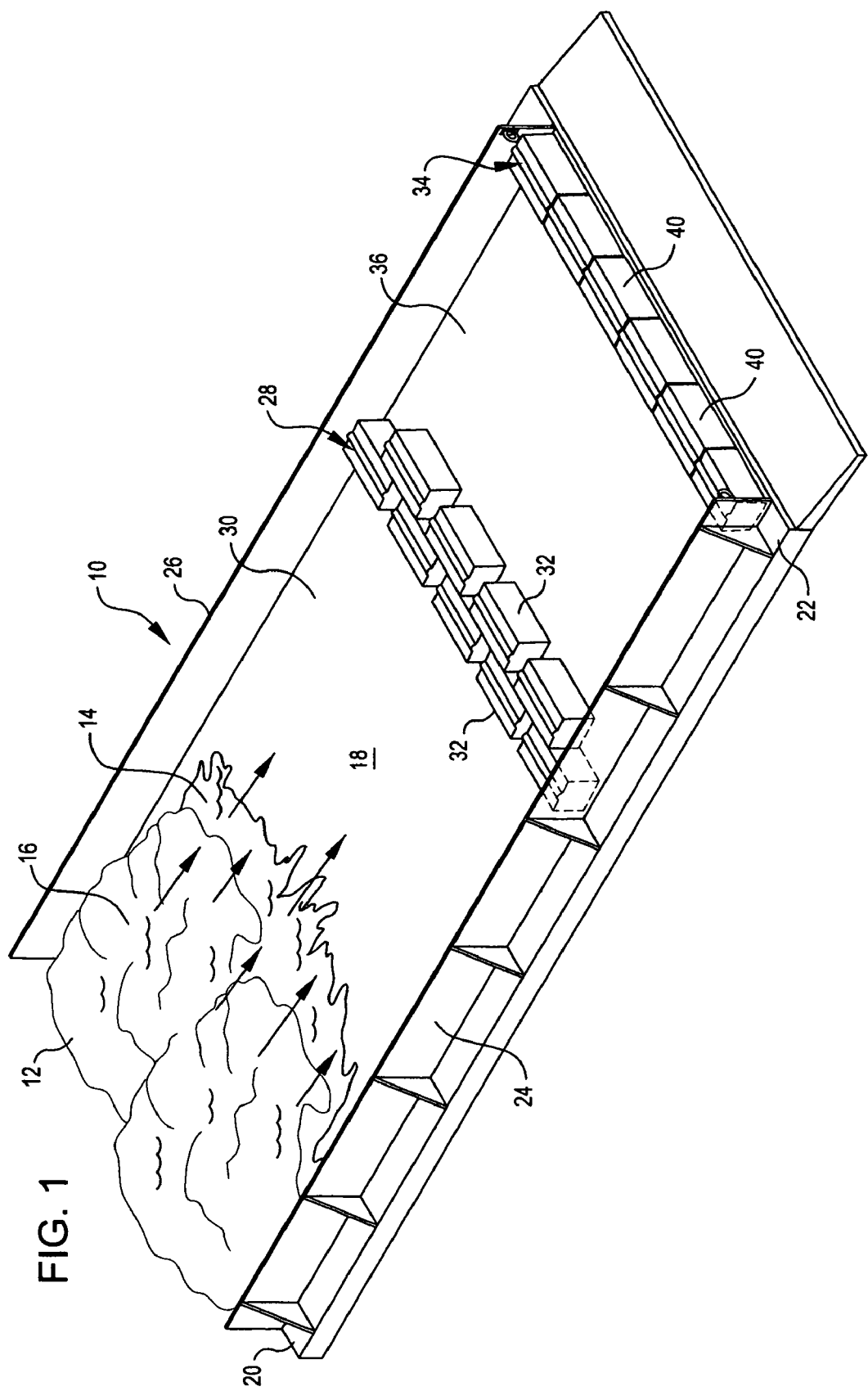
FIG. 1 is a perspective view of the upper surface of a preferred embodiment drain barge having an upper surface configured for dewatering dredge spoils, showing the dredge spoils shortly after being deposited thereon.
Figure 2:
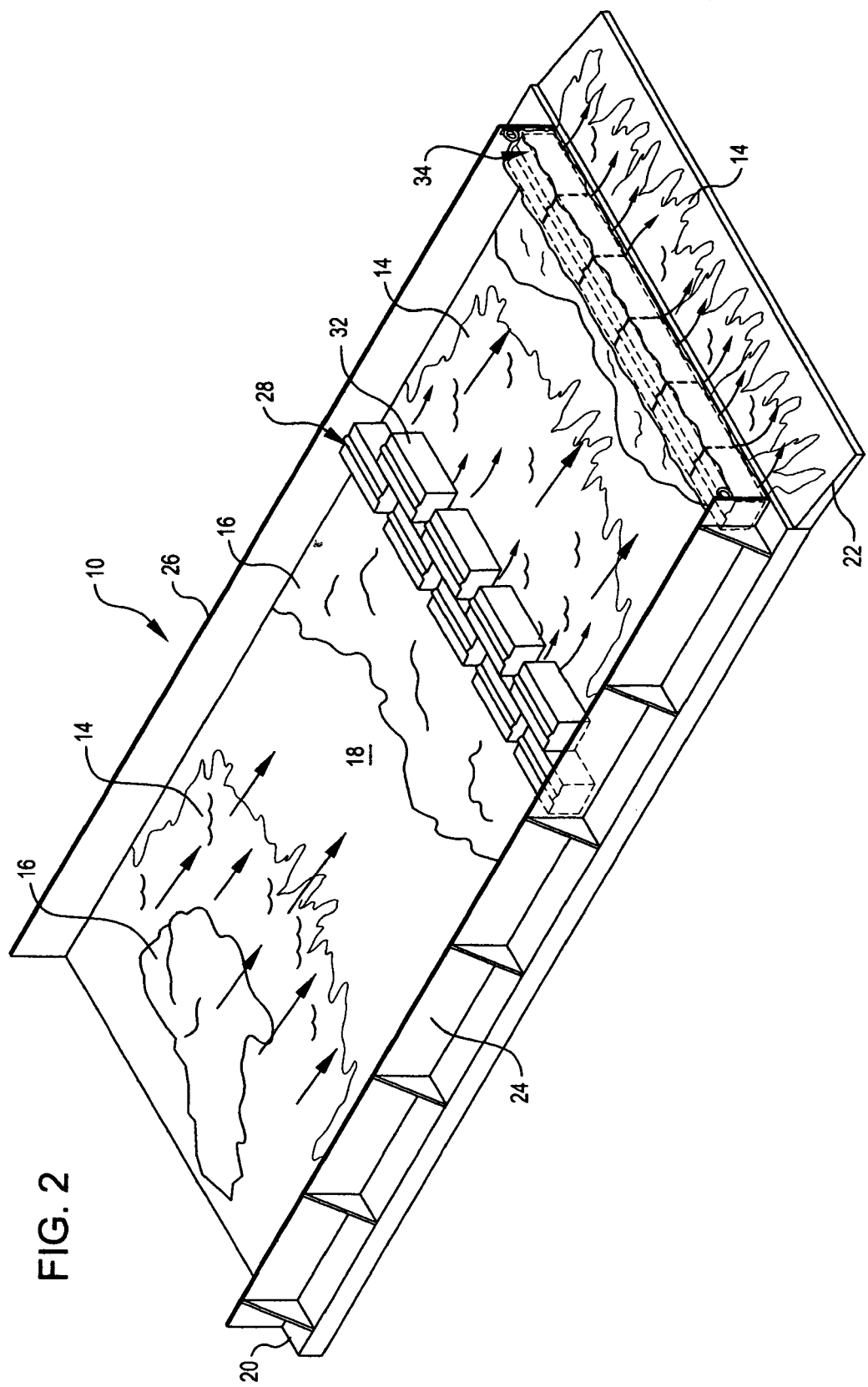
FIG. 2 is a perspective view of the drain barge shown in FIG. 1, showing the dredge spoils after they have flowed down the surface of the barge.
Figure 3:
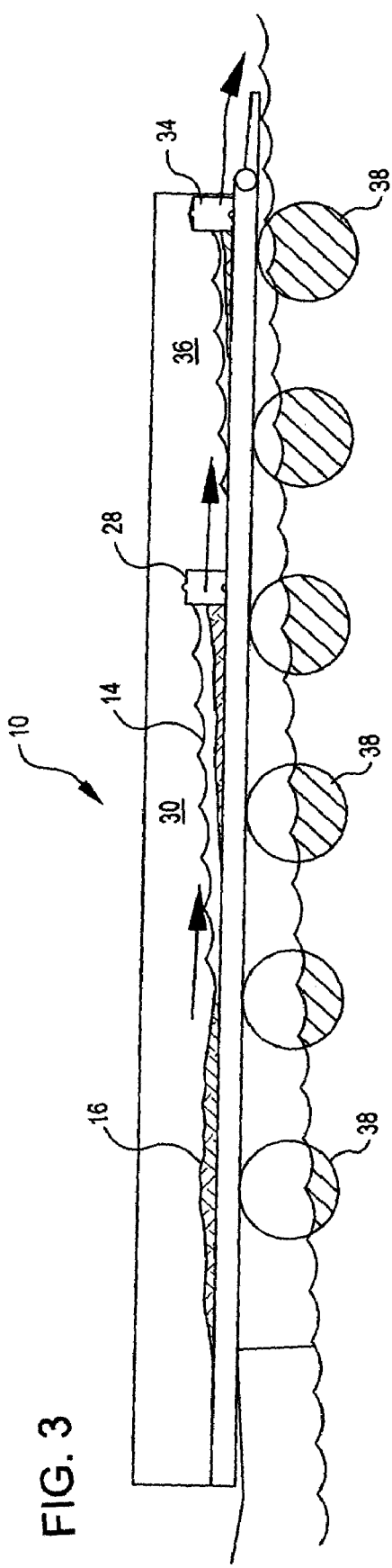
FIG. 3 is a sectional view of the drain barge illustrated in FIG. 2.
Figure 4:
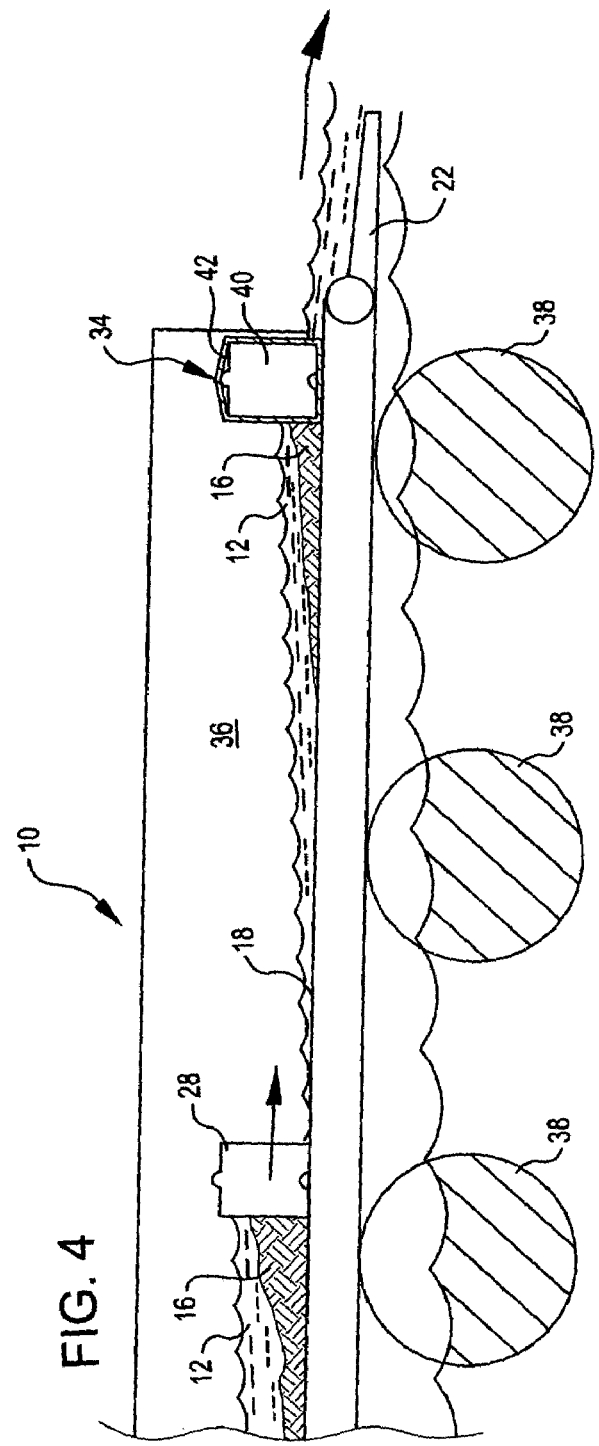
FIG. 4 is an enlarged sectional view, similar to FIG. 3, showing the dredge spoil accumulation at the rear of the drain barge illustrated in FIG. 2.

Referring to the drawings and in particular to FIG. 1, an apparatus 10 for dewatering dredge spoils 12 is illustrated. As used herein, the term "dredge spoils" will be understood to mean materials that are removed from a waterway during dredging operations. Regardless of the particular waterway and bottom involved, and regardless of the purpose for which the dredging operation is being carried out, the dredge spoils will be understood to contain both a liquid component 14, such as water, and a solid component 16, such as mud, silt or sand, suspended in the liquid. The general function of the dewatering apparatus 10 and method shown and described herein, is substantially to separate the solid components 16 of the dredge spoils from the liquid component 14. The liquid component 14 can then be returned to the waterway while the solid components 16 are collected for disposal elsewhere. It will be understood that these are relative terms, and that in practice, the complete separation of the solid and liquid components of the dredge spoils will most likely not be achieved.

In the preferred embodiment illustrated in FIGS. 1-4, the apparatus 10 provides a generally planar, generally horizontal surface 18 that is impervious to water and sufficiently rigid and durable to withstand having dredge spoils 14 deposited thereon. The surface 18 is gently inclined so as to form an uphill end 20 and a downhill end 22. The dredge spoils 14 removed from the waterway during the dredging operation are deposited onto the uphill end 20. They then flow along the surface toward the downhill end 22. A pair of sidewalls 24, 26 along the sides of the surface 18 help confine the dredge spoils 14 for flow from the uphill end 20 toward the downhill end 22.

As further illustrated, an attenuator structure 28 is provided across the surface 18 between the uphill and downhill ends 20, 22. The attenuator 28 functions to partially restrict or attenuate the flow of the dredge spoils 14 from the uphill end 20 to the downhill end 22. This has the effect of causing the dredge spoils 14 to pool or collect along the portion of the surface 18 uphill of the attenuator 28. A first retention area or settling pond 30 is thus formed on the portion of the surface 18 uphill of the attenuator 28. By slowing the flow over the surface 18, the solid components 16 of the dredge spoils are given an opportunity to settle out onto the surface 18. Relatively clear water is left behind.

In the illustrated embodiment, the attenuator 28 is preferably formed of a plurality of elements 32, referred to herein as ecology blocks, arranged to form a wall-like baffle, dam or barrier across the surface 18. Unlike a true wall or dam, the attenuator 28 permits liquid flow, and its function is to slow, rather than totally restrict, the flow from the uphill end 20 of the surface 18 to the downhill end 22. To this end, the blocks 32 are placed in close proximity to each other, but with a gap between adjacent blocks to permit the desired flow. In the illustrated embodiment, the blocks 32 are substantially rectangular in form and are arranged in two closely spaced, parallel rows of blocks placed end-to-end across the surface 18. Preferably the blocks 32 are formed of concrete although other materials can be used.

In the illustrated embodiment, the apparatus 10 further includes an end barrier or weir 34 extending substantially across the width of the downhill end 22. The weir 34, in conjunction with the sidewalls 24, 26, forms an additional settling pond 36 for drain water at the downhill end 22 of the surface 18.

In use, dredge spoils 12 are deposited onto the uphill end 20 of the dewatering apparatus 10 after being brought up from the bottom of the waterway. The heavier solid components 16, which often make up the bulk of the solids removed from the waterway bottom, immediately settle onto the surface 18 where the dredge spoils are initially deposited. After several bucketfuls of dredge spoils are deposited, a pile of solids will accumulate. Eventually, they can be removed by means of a clamshell bucket, a bucket loader or similar earth-moving apparatus. The water component 14 of the dredge spoils 12 drains off and begins flowing downwardly toward the lower, downhill end 22 under the force of gravity. Although the bulk of the solids 16 deposit out onto the surface 18 relatively quickly, the lighter components remain suspended and are carried along by the water 14 toward the downhill end 22. It is desirable to remove much of these remaining suspended solids before returning the water 14 back to the waterway.

In the illustrated embodiment, the water along with the remaining suspended solids flows into the first settling pond 30 defined by the attenuator 18. The reduced flow rate caused by the attenuator 28 slows the water 14 thereby permitting many of the still-suspended solids 16 to settle out onto the surface 18. These solids 16 tend to accumulate against the blocks 32 making up the attenuator 28. The water 14 and any remaining solids 16 still suspended therein flow around and between the individual blocks 32 and continue downwardly along the inclined surface 18 toward the weir 34 and into the second settling pond 36.

By the time the dredge spoils 12 reach the weir 34, the bulk of the solids 16 have settled out onto the surface 18 leaving relatively clear water 14 behind. The relatively clear water 14 then passes through the weir 34 and flows off the downhill end 22 of the surface 18 back into the waterway.

The solids 16 that are deposited onto the surface 18 can, from time to time, be removed by various conventional means, such as clamshell buckets, bucket loaders and shovels. Removal of the solids is facilitated by the fact that they tend to accumulate more deeply along the attenuator 28, the side walls 24, 26 and the weir 34.

Preferably, the dewatering apparatus 10 and method are implemented in the form of a floating barge having a planar upper deck which forms the surface 18. The barge can be towed to the area of the dredging operation and anchored or otherwise secured in place. Preferably, the barge includes one or more ballast tanks 38 (FIGS. 3 and 4) that can be flooded as needed to lower one end, such as the stern, relative to the other, such as the bow. When so ballasted, the bow forms the uphill end 20 of the surface 18 while the stem forms the downhill end 22. To avoid corrosion, the barge is preferably ballasted with fresh rather than salt water. The sidewalls 24, 26 can be formed by a plurality of steel plates positioned along the sides of the barge.

On advantage to using barges for this purpose is that they typically already include the planar upper surface 18 or deck and the ballast tanks 38, and, therefore, require little if any modification for use in the dewatering method. Furthermore, the slope of the deck can, within limits, be adjusted by controlling the amount of ballasting to control how quickly or slowly the dredge spoils flow along the inclined surface 18.

In the illustrated embodiment, the weir 34 is preferably formed of concrete or other blocks 40 laid end-to-end. The blocks may or may not be the same as the blocks 32 making up the attenuator 28. Sufficient space exists between the blocks 40 for water 14 to flow through the weir 34 and off the end 22 of the surface 18 back into the waterway. Again, the weir 34 slows the flow sufficiently to cause the water to pool in the settling pond 36 formed immediately upstream of the weir 34, thereby giving suspended solids 16 an opportunity to settle out. Preferably, the blocks 40 are covered with a filtering element, such as a filter cloth 42, to provide additional filtering before the water 14 is returned to the waterway. Although not critical, a suitable cloth for this purpose is a geotextile fabric available through Northwest Linings of (location) under product (name). Preferably, the cloth 42 is positioned along the inboard face and tops of the blocks 40 and is held in place through water saturation and accumulated dredge spoil solids 16. The placement and form of the filter cloth 42 is not critical, the goal being to provide additional filtering before the water 14 is returned to the waterway.

Still additional filtering can be provided by positioning straw bales or similar material alongside the weir 34. The bales, as well as the filter cloth 42, can be replaced as needed as they get clogged with debris and sediment. Accumulated sediment in the second settling pond 36 is removed from time-to-time as needed.

It will be appreciated that the apparatus 10 and the method it implements provide an efficient and economical way of dewatering dredge spoils 12. The dredge spoils 12 need only be deposited onto the uphill end 20 of the surface 18 as they are removed from the waterway. Thereafter, gravity causes the spoils 12 to flow along the inclined surface 18. The relatively clear water 14 that results automatically flows back into the waterway after the bulk of the solids 16 settle out onto the surface 18.

Figure 5:
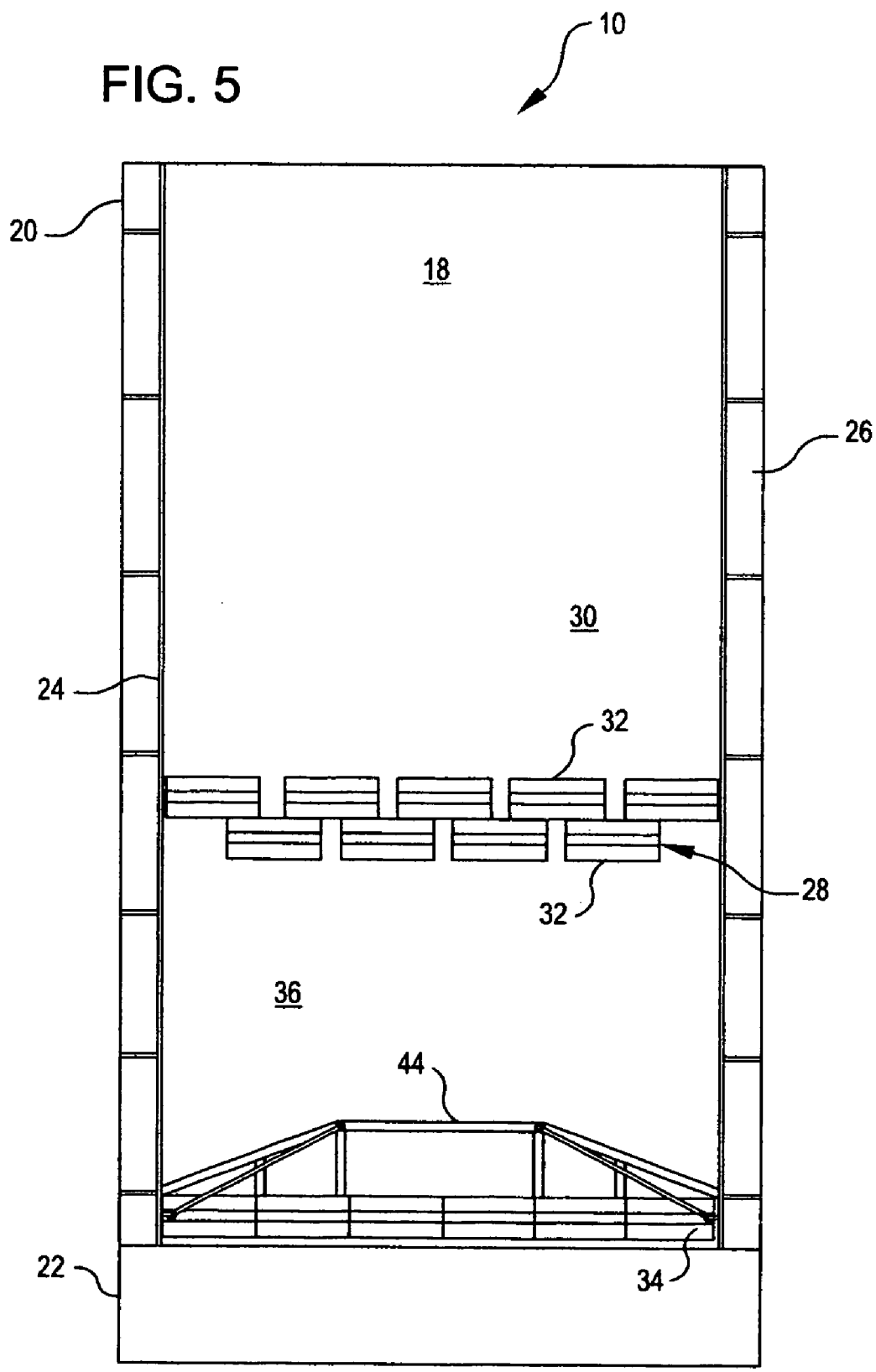
FIG. 5 is a top plan view of an alternative embodiment drain barge, similar to that shown in FIG. 1, showing a skimmer structure at the rear of the barge.
Figure 6:
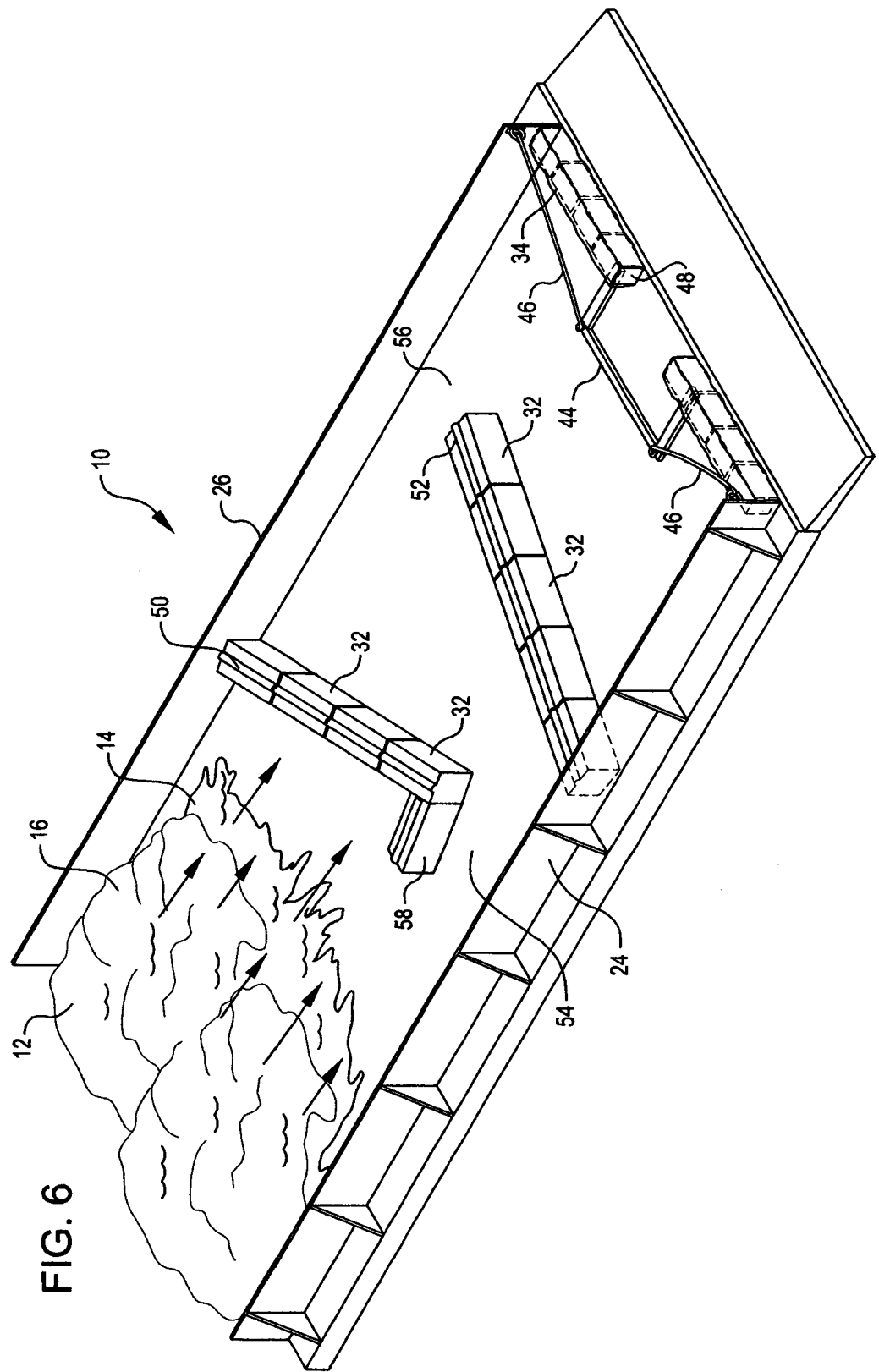
FIG. 6 is a perspective view, similar to FIG. 1, of an alternative embodiment drain barge.
Figure 7:
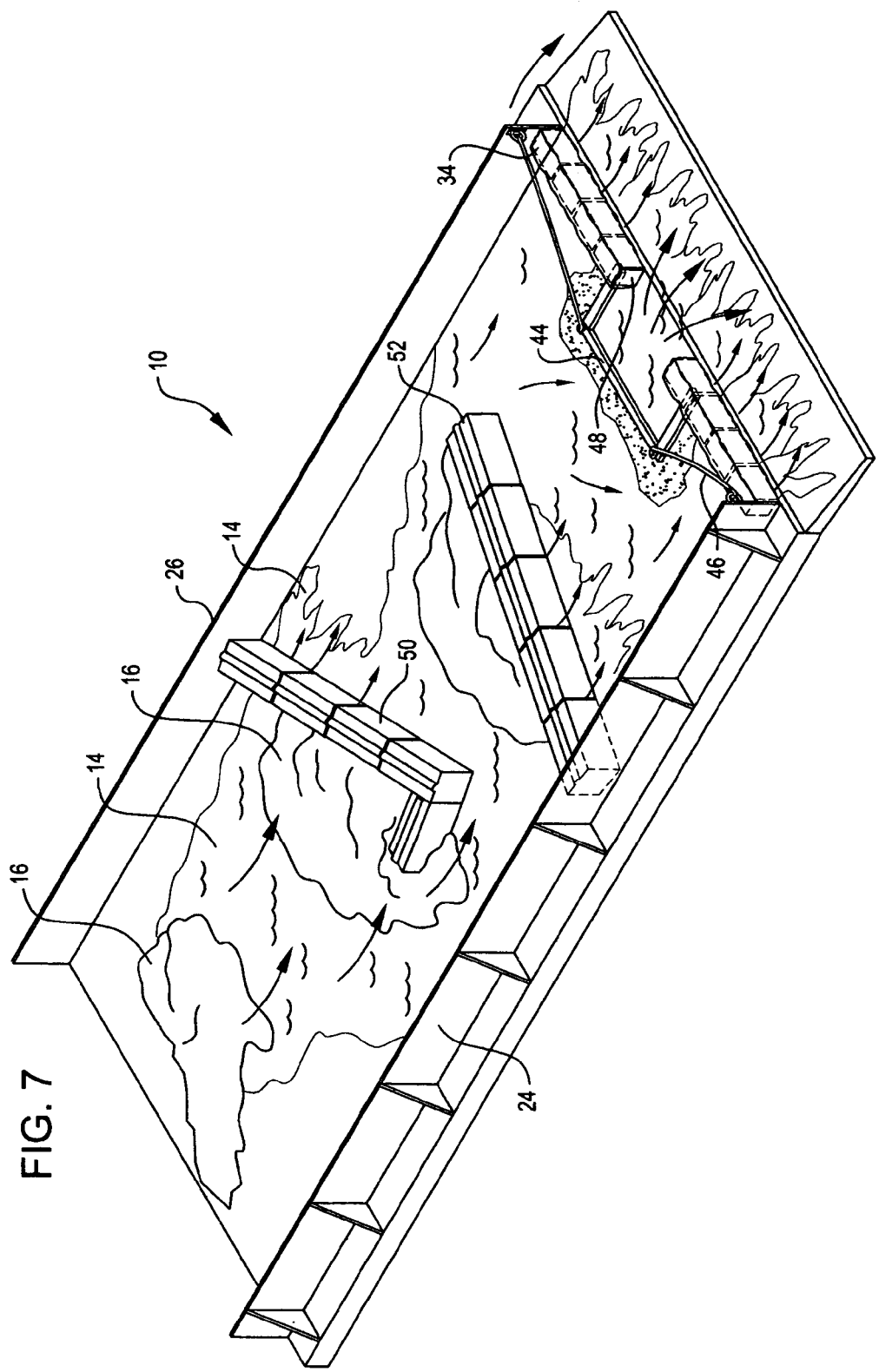
FIG. 7 is a perspective view, similar to FIG. 2, showing the alternative embodiment drain barge after dredge spoils have flowed down the surface of the barge.

The attenuator structure 28 shown in FIGS. 1-4 is preferred because it is effective in slowing the flow, is easy to implement and makes removal of the accumulated solids 16 easy using a clamshell bucket. It will be appreciated, however, that this attenuator structure 28 is not the only structure that can be used and that other structures and configurations can be used as well. Examples of such alternatives are shown in FIGS. 5-7. It will be understood that these alternative embodiments, too, are meant to be illustrative, rather than limiting, and that still other configurations can be used without departing from the spirit and scope of the invention in its broader aspects.

In the embodiment shown in FIG. 5, a skimmer structure 44 is provided in conjunction with the weir 34. The skimmer 44 extends upwardly from the surface 18 upstream of the weir 34 and helps trap floating debris and other contaminants that may be on the surface of the water 14. Preferably, the skimmer 44 is formed of 2×4 lumber that rests on the surface 18. If desired or needed, supports 46 for supporting the skimmer 44 can also be provided.

In the embodiment shown in FIGS. 6 and 7, an opening 48 is provided in the center of the weir 34 and a skimmer 44 is provided around the opening 48 as shown. As in the embodiment shown in FIG. 5, the skimmer 44 functions to trap and retain debris floating on the water 14 and keep it from flowing through the weir 34. As further illustrated, two or more attenuators 50, 52 are provided in place of the single attenuator 28 used on the embodiment of FIGS. 1-4. Preferably, the attenuators 50, 52 are formed by separate concrete blocks, that can be the same as the blocks 32 used in the embodiment shown in FIGS. 1-4, laid end-to-end. The blocks 32 can be positioned on the surface 18 as desired to create baffles of differing sizes, shapes and orientations.

In FIGS. 6 and 7, neither of the attenuators 50, 52 extends fully across the surface 18. Instead, the upstream attenuator 50 extends from the right sidewall 26 across the surface 18, while the downstream attenuator 52 extends inwardly along the surface 18 from the left sidewall 24. Each of the attenuators 50, 52 terminates short of the opposite side, thereby leaving a gap 54, 56. In the illustrated embodiment, the upstream attenuator 50 includes a lip 58 to help contain accumulated solids 16. Water 14 flowing downwardly along the surface 18 first encounters the upstream attenuator 50 and flows along it until reaching the gap 54. The water 14 flows through the gap 54 and then downwardly along the surface 18 until it encounters the downstream attenuator 52. The water 14 flows along the downstream attenuator 52 until reaching the second gap 56, at which point it flows into the settling pond defined by the weir 34. The two attenuators 50, 52 thus slow the water flow along the surface 18 thereby allowing the suspended solids 16 to settle out. The solids tend to accumulate along the attenuators 50, 52 where they can, from time to time, be removed as needed.

Again, it will be appreciated that the number, size, orientation and shape of the attenuators 50, 52 is not critical to the invention in its broader aspects and that these variables can be adjusted depending upon such considerations as the size of the barge, the slope of the surface, the nature of the dredge spoils and the degree of dewatering desired.

One advantage of using concrete, straw bales or other blocks to form the attenuators and weir is that they are relatively inexpensive, durable and easily obtained. Additionally, they can be easily moved around on the surface of the sloping barge as needed to form the most effective dewatering arrangement based on local conditions. Although concrete blocks are preferred, it will be appreciated that the invention is not limited to such elements and that other forms of attenuator and/or weir structures can be used, the principal requirement being that they slow the flow of dredge spoils and facilitate the accumulation of solids on the surface.

While a particular embodiment of the invention has been shown and described, it will be apparent to those skilled in the art that changes and modifications can be made without departing from the invention in its broader aspects, and, therefore, the aim in the appended claims is to cover all such changes and modifications as fall within the true spirit and scope of the invention.

What is claimed is:

1. A sloping dredge barge for dewatering dredge spoils, comprising:
    a floating barge having a generally planar water impervious upper surface, said barge being ballasted so that said upper surface slopes from an uphill end to a downhill end;
    a plurality of blocks disposed along said upper surface to form an attenuator defining a first settling pond on said upper surface upstream of said attenuator; and
    a plurality of blocks forming a weir adjacent said downhill end and defining a second settling pond on said upper surface upstream of said weir and downstream of said attenuator, whereby solid components of the dredge spoils deposited onto said surface adjacent said uphill end settle out and are deposited onto the planar surface as liquid component of the dredge spoils flow through said settling ponds toward said downhill end.

2. A sloping dredge barge as defined in claim 1 further comprising one or more tanks for ballasting said barge to create said downhill end.

3. A sloping dredge barge as defined in claim 2 wherein said weir includes a filtering element adjacent said blocks.

4. A sloping dredge barge as defined in claim 3 wherein said filtering element comprises a filter cloth disposed over said blocks forming said weir.

5. A sloping dredge barge as defined in claim 2 further including side walls adjacent the sides of said barge for confining the movement of dredge spoils between said uphill and downhill ends of said barge.

6. A sloping dredge barge as defined in claim 5 further including an opening in said weir and a skimmer around said weir for restraining floating debris from passing through said opening.

* * * * *